Patented Aug. 24, 1948

2,448,005

UNITED STATES PATENT OFFICE 2,448,005

AQUEOUS WOOL TREATING BATHS COMPRISING CHLOROPRENE COPOLYMERS

John B. Rust, East Hanover, N. J., assignor to Montclair Research Corporation, a corporation of New Jersey No Drawing. Original application March 26, 1946, Serial No. 657,335. Divided and this application April 17, 1947, Serial No. 742,200

6 Claims. (Cl. 260—29.7)

1

This invention relates to the shrinkproofing of wool, to methods for obtaining shrinkproofed wool, to the products resulting from such treatment, and to materials utilized for those purposes.

Among the objects of the present invention is the treatment of wool and wool containing fabrics to render them substantially resistant to felting, fulling and shrinkage by the use of relatively simple treatment processes, and inexpensive materials for obtaining those results, wherein danger or damage to fibers or interference with the desired wearing qualities and hand of the wool materials are eliminated.

Other objects include shrinkproofed wool and wool containing fabrics.

Still further objects include treating baths and other materials for conditioning wool for purposes set forth above.

Other and further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, the wool either as raw wool, yarn, knit, woven goods or mixed goods, is shrinkproofed with a copolymer of chloroprene and a vinyl compound selected from the group consisting of ethyl acrylate, styrene, and acrylonitrile, the amount of vinyl compound present in producing the copolymer, being insufficient to interfere with the shrinkproofing effect of the chloroprene derived material, but the added vinyl compounds giving certain selected properties to the copolymer making them useful in shrinkproofing. The amount of copolymer utilized on the wool will generally not be less than 1% nor more than 25% based on the weight of the wool.

The best shrinkproofing effects are obtained with the chloroprene polymer alone, chloroprene copolymers with butadiene-1.3, or mixtures of such

2 chloroprene polymers with other straight butadiene-1.3 polymers or butadiene-1.3 homolog polymers; and such materials may be used alone or in any proportions to give notably superior non-felting effects than when other polymers, latices, factice, etc., are present. The butadiene-1.3 derivatives that may be employed as polymers with the chloroprene polymer include butadiene-1.3 itself, isoprene, dimethyl butadiene, ethyl butadiene, ethoxy and methoxy butadiene, cyano butadiene, and the like, in all instances the butadiene-1.3 derivatives giving the best results. It will be seen that both copolymeric materials as well as mixtures of polymers may be employed.

It has been found that certain unexpected advantages and results accrue in using copolymeric materials. For example, while straight polychloroprene gives a very satisfactory shrinkproofing effect, there is present a somewhat harsh feel to the wool, and straight polybutadiene-1.3 gives satisfactory shrinkproofing but tends to give a slight "sticky" or "greasy" feel, the copolymers of those stated derivatives such as that of Example 9 hereinafter set forth, gives shrinkproofing with neither harshness nor stickiness.

As indicated above, however, for some purposes, copolymeric materials may be employed to modify the effects obtained, such added materials in the copolymer being used in limited proportions and in no event to produce an undesirable effect on the shrinkproofing of the wool within the limits desired. Such materials may be utilized with the chloroprene polymer or the chloroprene polymer together with other butadiene-1.3 polymers and butadiene-1.3 homolog polymers, the copolymerizing vinyl compound being an alkyl acrylate such as ethyl acrylate, styrene and its derivatives such as $\alpha,\rho$ dimethyl styrene and dichlorostyrene, or an acrylonitrile such as acrylonitrile, methacrylonitrile, etc. Unexpected results are obtainable with such combinations, as for example, the chloroprene-acrylonitrile copolymer gives excellent shrinkage control combined with a very good "hand." Or the alkyl acrylate copolymers with chloroprene may be used to give increased abrasion resistance. These examples illustrate the unexpected results obtained by the utilization of copolymerizing substances with the chloroprene in producing materials primarily employed for shrinkproofing of wool. For most of these combinations, from the standpoint of obtaining the best results in shrinkproofing, limitations on proportions are given, it being understood, however, that satisfactory results may sometimes be obtained with proportions outside of those stated depending on the particular materials present and their manner of utilization. In general it may be stated that for utilizing the copolymers in shrinkproofing of wool, the vinyl compound which is employed should not exceed 60% of the polymerizing materials in the copolymer and in some cases preferred results are obtained with lesser proportions and ranges. Thus with the acrylates, particularly the alkyl acrylates, they should generally not exceed about 60% of the total polymers present up to about 40% of methyl acrylate, up to about 50% of ethyl acrylate, and up to about 60% of butyl acrylate being the upper limits which should not generally be exceeded. With styrene and its derivatives there may be up to 60% of the total of polymers present, for example, not more than 60% styrene although up to about 30% gives the best results, and up to about 40% of dimethyl styrene or dichlorostyrene. With acrylonitriles the best results are obtained with up to about 40%, the effects obtained depending to some extent on the buffer present. The lower limit of copolymerizing vinyl compound present is not limiting but sufficient of the vinyl compound should be present to give the extent of desired properties in the compound. Generally a substantial amount of vinyl compound selected from the indicated groups should be present, or stated differently, this should be at least 5% up to the upper limits indicated above. Of course, various combinations of the copolymers as set forth above may be employed, and where proportions are indicated above for particular materials, similar proportions are best observed in such combinations.

The chloroprene polymer containing composition may be applied to the wool in any desired way. Such compositions may be applied to the wool, for example, by padding the wool material with aqueous emulsions of such chloroprene polymer compositions utilizing such aqueous emulsions containing an amount of the polymer sufficient to deposit the polymer on the wool in an amount to give the shrinkproofing effect. Thus baths containing about 5% of the polymer may be used for padding purposes or the bath may contain from 1 to 50% of the polymer.

Desirably the chloroprene polymer containing materials can be utilized in the form of aqueous emulsions utilized to deposit the polymer on the wool by exhaustion processes. Thus an aqueous bath containing the chloroprene polymer in emulsion form together with emulsifying agents and desirably with conditioning electrolytes may be utilized. Baths used for deposition of the copolymer by exhaustion will generally contain from 1-2 to 20% and preferably about 5% of the copolymer.

Such baths may be made in substantially stable condition so that no deposition of the polymer occurs under ordinary conditions. However, the addition of sufficient strong electrolyte may be utilized to cause exhaustion of the bath and deposition of the polymer on the wool fibers. Exhaustion of the bath may be made to take place with varying rapidity depending mainly upon temperature and electrolyte concentration.

The amount of electrolytes utilized to cause exhaustion of the bath may vary over substantial limits but sufficient electrolyte should be present to condition the bath so that the bath although stable in the absence of wool fibers, will deposit the polymer in the presence of the conditioning electrolyte. Thus the electrolyte content may vary between from about 25% to about 500% based on the weight of the chloroprene polymer derivative present. As such electrolyte, water-soluble salts may be used, desirably such salts which do not precipitate the polymer. The following are exemplary: sodium sulfate, sodium chloride, sodium bromide, sodium iodide, sodium phosphate, sodium sulfamate, sodium sulfite, sodium bisulfate, sodium bisulfite, sodium nitrate, sodium acetate, and the like, and similar salts of potassium, lithium, caesium, and so forth. Salts like zinc chloride may also be used where the coagulation is not too serious, any polymer is present in small particulate form, and the particles may be redispersed by stirring. Neutral salts, specifically salts of strong bases and strong acids, particularly inorganic salts, are preferred. The term "conditioning electrolyte" is used hereinafter to cover such electrolytes which produce the desired deposition of the polymer in the baths by exhaustion methods as set forth above.

The temperatures at which the polymer or bath containing the polymer is applied to the wool may vary from room temperatures to the boiling points of the bath and more desirably there are utilized temperatures above 40° C. Padding operations may take place at ordinary temperatures or at elevated temperatures. The exhaustion bath methods are desirably carried out at temperatures from 40° C. to the boiling point of the bath. The process can be applied before or after fulling, weaving, scouring and the like operations. In some cases it can be applied in the dye bath. Mixed goods including wool-cotton, wool-rayon, etc., can be treated by this method without any deleterious effect. The wool may be subjected to a pretreatment, as for example, treatments with acids such as acetic acid, or chlorination or bromination, before being treated in accordance with the present invention. The acetic acid pretreatment of the wool is particularly desirable.

When emulsions containing the chloroprene polymer are employed, emulsifying agent may be any anionic emulsifying agent stable under the conditions of the bath at the temperatures employed. Baths having a pH above 7 may desirably be employed where the material is to be stored or kept for some length of time since greater stability of bath may be produced in this way. However, for deposition purposes a bath having a pH below 7 is desirably utilized but the invention is not limited to the use of that pH concentration. Emulsifying agents which may be used include sodium lauryl sulfonate, sodium alkyl naphthalene sulfonates, long chain alkyl sodium sulfonates, sodium dioctyl sulfosuccinate, etc. There may also be used neutral non-cationic emulsifying agents such as mannitol monolaurate, the reaction product of protein degradation products with acid chlorides, ethylene oxide reaction products with fatty acid, fatty alcohols, and the like.

After treatment of the wool in accordance with the present invention it is desirably rinsed and dried. Its properties have been altered to such a degree that it no longer has a tendency to felt during washing and consequently is non-shrinking also.

With reference to the preparation of the padding liquors for use in examples which follow, the procedure may consist of diluting the prepared polymer emulsions with water. When two emulsions are used, the emulsions are usually mixed in the proper proportions and then diluted with water to the proper concentration. The following table will illustrate this procedure for padding liquors used in Example 1.

*Preparation of 300 parts of padding liquor containing 5% polymers*

| Per cent Polymer desired Neoprene Latex | Composition desired Rhoplex ER | 58.6% Neoprene Latex, parts | 50% Rhoplex ER, parts | Water added, parts |
|---|---|---|---|---|
| 85 | 15 | 21.8 | 5.5 | 273 |
| 75 | 25 | 19.4 | 7.5 | 273 |
| 60 | 40 | 15.3 | 12.0 | 273 |

The other examples were prepared in a similar manner. When only one emulsion is used, the emulsion is simply diluted with water to a 5% concentration.

The following examples illustrate the invention, the parts being by weight unless otherwise indicated.

*Example 1.*—A series of three padding solutions was prepared using polychloroprene and polyethyl acrylate emulsions, known to the trade as "neoprene latex type 571" and "Rhoplex ER" respectively.

Samples of wool flannel 10" x 10" in size were padded from these solutions and the excess of pad liquor was removed by passing the sample through squeeze rollers. The weight of the wool samples was noted before and after padding and from the weight increase the amount of polymer applied to the fabric was calculated. The composition of the polymer and the amount deposited on the fabric are shown in Table I.

The samples were dried at approximately 60° C. and four lengths of 8" each were marked on each sample, two in the direction of the warp and two in the direction of the fill.

The wool samples were then washed for 3 hours in a mechanical washing machine.

The samples were rinsed and dried and the measurements were taken again. The percentage shrinkage in warp and fill direction is shown in Table II.

*Table I*

| Sample No. | Per cent Polymer Deposited On Wool | Per cent Comp. of Polymer | |
|---|---|---|---|
| | | Polychloroprene | Polyethylacrylate |
| 1 | 6.11 | 85 | 15 |
| 2 | 6.01 | 75 | 25 |
| 3 | 6.02 | 60 | 40 |

*Table II*

| Sample No. | Per cent shrinkage after 3 hr. washing | | Felting |
|---|---|---|---|
| | Warp | Fill | |
| 1 | 5.3 | 3.1 | None. |
| 2 | 8.3 | 1.2 | Slight. |
| 3 | 12.1 | 2.8 | Moderate. |

*Example 2.*—A treating bath was made by mixing 280 parts water, 1.19 parts of a straight polychloroprene emulsion containing 58.6% solids, as mentioned in Example 1, .06 part of sodium lauryl sulfate and 1.4 parts of acetic acid 50%. The bath was heated to 65° C. and a swatch of wool weighing 13.9 parts was immersed in this bath. The wool was agitated for 10 minutes and then 7 parts of 15% solution of anhydrous sodium sulfate was added. The fabric was agitated continuously, and further additions of sodium sulfate solution were made at 5 minute intervals. After a total of six such additions had been made, the bath exhausted completely. The wool was then rinsed and dried at 60° C. and four lengths of 8" each were marked on the sample, two in the direction of the warp and two in the direction of the fill. The sample was then washed for 3 hours with soap and water in a mechanical washing machine. After the washing the sample was rinsed and dried, and measured again. The percentage shrinkage in the warp and fill direction is listed in Table III.

*Example 3.*—14.0 parts of wool flannel was immersed in a bath consisting of 280 parts of water and 1.12 parts of glacial acetic acid. The temperature of the treating bath was kept at 65° C. during the entire operation. After 5 minutes 2.8 parts of a straight polybutadiene emulsion (25% solids) was added to the bath and the wool sample was agitated. The polybutadiene emulsion was prepared according to the procedure described in Rust and Pfeifer application Serial No. 603,406, filed July 5, 1945. Five minutes later 1 part of anhydrous sodium sulfate dissolved in 6 parts of water was added. These additions were repeated at 5 minute intervals until a total of 6 parts of the salt was added. The bath became completely clear 5 minutes after the last salt addition was made. The fabric was rinsed and dried. The sample was marked off, washed, rinsed, dried and remeasured as explained in Example 2. The shrinkage and degree of felting due to the laundering may be found in Table III.

The treatment with glacial acetic acid as given in the above example is to regulate the pH and is a prelude to the dyeing-out method employed in such examples. Any acid can be used in a concentration equivalent to the acetic acid as indicated. Other examples will be found below.

*Example 4.*—A swatch of wool weighing 12.5 parts was soaked in a solution of 250 parts of water containing 1.6 parts of 50% acetic acid for 5 minutes. At the end of this period 10% of a straight polybutadiene (25% solids) emulsion, prepared as described in Example 3, and 4.25% of a straight chloroprene emulsion (known commercially as "neoprene latex type 571", conc. 58.6% solids) were added. Both percentages are based on the weight of the wool. Also .05 part of sodium lauryl sulfate was added at this time. After 5 minutes 7% of anhydrous sodium sulfate (based on the wool weight) dissolved in a sufficient quantity of water was added and these additions were repeated until the bath exhausted completely clear. In order to accomplish this it was found that 42% of sodium sulfate was needed. The temperature of the bath was kept at 65° C. during the entire operation, and the sample was agitated continuously. The swatch was then rinsed and dried. The washing and measuring procedure is described in Example 2, while the shrinkage and felting results are tabulated in Table III.

*Example 5.*—A treating bath was prepared by mixing 300 parts of water at 70° C., .75 part polybutadiene emulsion (25% solids), prepared as described in Example 3, .96 part polychloroprene emulsion (58.6% solids), as used in Example 1, 2.18 parts of 50% acetic acid and .09 part of sodium lauryl sulfate.

A swatch of wool was immersed in this bath for 10 minutes and then 42.5% (based on the weight of the wool) of anhydrous sodium sulfate dissolved in sufficient water was added over a period of 30 minutes. The bath was kept at 65° C. during the entire operation and the wool was agitated continuously. The bath exhausted completely.

After rinsing and drying the sample was washed and measured as before. Shrinkage percentages and felting are listed in Table III.

*Example 6.*—14.6 parts of wool flannel was treated with a solution of 1.7 parts acetic acid 50%, in 290 parts of hot water (70° C.) for 5 minutes. At the end of this time there was added to the bath 2.2 parts of a 25% polybutadiene emulsion, prepared as described in Example 3, .37 part of a 49.4% polychloroprene emulsion, as mentioned in Example 1, and .03 part of sodium lauryl sulfate. The fabric was agitated in this liquor for 5 minutes whereupon 7 parts of a 15% anhydrous sodium sulfate solution was added. The bath was kept at 65° C. and five more additions of 7 parts 15% sodium sulfate solution were made at 5 minute intervals. Five minutes after the last salt addition had been made the bath cleared up completely. Also a swatch of untreated wool was given a relaxation treatment. This was accomplished by soaking the fabric in a 1% neutral soap solution at room temperature for 2 hours. Both pieces of wool were then rinsed, dried and measured. For washing the procedure of Example 2 was followed. After the laundering the samples were rinsed, dried and remeasured. The percentage of shrinkage and the degree of felting are listed in Table III.

*Table III*

| Example No. | Per cent shrinkage after 3 hr. washing | | Felting |
|---|---|---|---|
| | Warp | Fill | |
| 2 | 3.7 | +1.6 | Slight. |
| 3 | 2.1 | 2.3 | None. |
| 4 | 4.2 | 1.3 | Slight. |
| 5 | 4.2 | 0 | Very light. |
| 6 | 2.3 | 1.2 | None. |
| 6 (untreated) | 38.8 | 18.5 | Very bad. |

*Example 7.*—A series of three padding solutions containing 5% solids utilizing various types of polychloroprene dispersions. These dispersions are known commercially as "neoprene latex." A bath having a solids content of 5% was prepared from a polybutadiene dispersion. This polybutadiene dispersion contained 25% solids and was prepared according to the method described in Rust and Pfeifer application Serial No. 603,406. Squares of wool flannel were immersed in these treating baths until completely wet, and the excess liquor was removed by passing the fabric through squeeze rollers. The samples were then dried at 60° C. The composition of the different liquors as well as the amount of solids deposited on the wool may be found in the following table.

*Table IV*

| Sample No. | Type of Polymer | Per cent liquid picked up by wool | Per cent solids dep. on wool |
|---|---|---|---|
| 1 | Polychloroprene (neoprene latex type 572 48.9% solids). | 125 | 6.25 |
| 2 | Polychloroprene (neoprene latex 571 conc. 58.6% solids). | 125 | 6.25 |
| 3 | Polychloroprene (neoprene latex 60 58.6% solids). | 125 | 6.25 |
| 4 | Polybutadiene (Rust-Pfeifer Appln. No. 603,406). | 105 | 5.25 |

After drying the wool swatches, as well as an untreated control, which had been relaxed according to the procedure given in the previous example, were measured, and washed for 3 hours in a mechanical washing machine, containing water at 70° C. and sufficient neutral soap to produce a running suds.

After washing, the wool squares were rinsed, dried and measured.

The shrinkage percentages and the degree of felting are given in Table V.

*Table V*

| Sample No. | Per cent shrinkage after 3 hr. washing | | Felting |
|---|---|---|---|
| | Warp | Fill | |
| 1 | 8.0 | 4.6 | None. |
| 2 | 7.8 | 4.3 | Slight. |
| 3 | 10.5 | 5.1 | Do. |
| 4 | 7.9 | 5.1 | None. |
| Control untreated | 44.1 | 20.3 | Very bad. |

*Example 8.*—The padding solution of Example 7 was now adjusted in such a way as to contain 2% of solids. Samples of wool flannel were treated with these solutions, dried, washed and measured according to the procedure of the previous example. An untreated control was included in the washing. The amount of liquor absorbed by the wool will be found in Table VI, as well as the amount of solids deposited on the wool, which amount was obtained by calculation.

*Table VI*

| Sample No. | Treating Liquor | Per cent liquid picked up by wool | Per cent polymer deposited on wool |
|---|---|---|---|
| 1 | Neoprene latex type 572 2% solids | 124.5 | 2.49 |
| 2 | Neoprene latex type 571 2% solids | 122.8 | 2.46 |
| 3 | Neoprene latex type 60 2% solids | 121.8 | 2.44 |
| 4 | Polybutadiene emulsion 2% solids | 113.3 | 2.27 |

The shrinkage and felting observed after 3 hours laundering was as follows:

*Table VII*

| Sample No. | Shrinkage Percentage | | Felting |
|---|---|---|---|
| | Warp | Fill | |
| 1 | 9.6 | .7 | Slight. |
| 2 | 7.9 | 2.3 | None. |
| 3 | 9.4 | 3.3 | Slight. |
| 4 | 6.7 | 2.8 | None. |
| Control (untreated) | 32.4 | 16.1 | Very bad. |

*Example 9.*—Butadiene, 45 parts, was placed in a glass pressure bottle cooled to −15° C. Five parts of freshly distilled chloroprene were added. Ten parts of 1% aqueous potassium persulfate were added to 114 parts distilled water. This aqueous phase was added to the monomers. A 50% solution consisting of six parts of cetyl dimethyl benzyl ammonium chloride dissolved in 6 parts isopropanol was then added to the bottle. The bottle was sealed and placed in a shaking machine in a 12–15° C. water bath and shaken for 16 hours. The emulsion was then heated to 64° C. for 7 hours, then at 53–55° C. for 18 hours. A viscous homogeneous translucent emulsion was obtained. The emulsion contained 29% solids. A padding bath was prepared by diluting some of the emulsion with water until the solids content was 5%. A sample of wool flannel 10" x 10" in size was padded from the solution and the excess padding liquor was removed by passing the wool through squeeze rolls. The calculated solids pick-up are listed along with the polymer composition in Table VIII. The flannel was dried at approximately 60° C., measured as explained in Example 1. After rinsing and drying, the flannel was measured and warp and fill shrinkage were calculated. The felting as well as the shrinkage in percentage may be found in Table IX.

*Example 10.*—Butadiene, 40 parts, and chloroprene, 10 parts, were subjected to emulsion polymerization in exactly the same manner as was used with the 45 butadiene and 5 chloroprene proportion of Example 9. Polymerization conditions of time and temperature were identical as were the water phase, catalyst and emulsifier. This emulsion also contained 29% solids on polymerization.

A padding solution was prepared by diluting the above emulsion with water to adjust the solids content to 5%. Wool flannel was treated with this padding liquor, dried, washed, and measured according to the procedure of Example 9. The calculated solids picked up by the wool and the polymer composition will be found in Table VIII. The amount of shrinkage in percentage and felting after laundering will be found in Table IX.

*Example 11.*—Butadiene, 25 parts, and chloroprene, 25 parts, were placed in a glass pressure bottle cooled to below −15° C. Ten parts of 1% potassium persulfate were dissolved in 115 parts of water containing 6 parts cetyl dimethyl benzyl ammonium chloride and 6 parts isopropyl alcohol. This water phase was cooled to 5° C. and added slowly to the monomers. The pressure bottle was then sealed, placed in a shaking device in a 12–15° C. water bath and shaken for 6 hours. The bath temperature was then raised to 46° C. over a 4 hour period, then held at that temperature for 9 hours. The temperature was then raised to 53° C. for 3 hours. Polymerization was complete and a homogeneous emulsion was obtained. Solids content was 27½%. A portion of the emulsion was oxidized by refluxing with 5% of its weight of 30% hydrogen peroxide solution for 1 hour. The oxidized emulsion was diluted to a 5% solids concentration by adding distilled water to form a padding liquor.

Wool flannel was treated with the above padding liquor, dried, washed, and measured according to the procedure of Example 9. The calculated solids picked up by the wool and the polymer composition will be found in Table VIII. The amount of shrinkage in percentage and felting after laundering will be found in Table IX. A piece of untreated wool was relaxed by soaking in 1% soap solution for 2 hours, rinsed, dried, and measured as a control as seen in Table IX.

*Table VIII*

| Sample No. | Percent composition of polymer | Percent solids picked up by wool (calc.) |
|---|---|---|
| 1 | 90% butadiene, 10% chloroprene (Example 9). | 6.0 |
| 2 | 80% butadiene, 20% chloroprene (Example 10). | 5.8 |
| 3 | 50% butadiene, 50% chloroprene (Example 11). | 5.1 |

*Table IX*

| Sample No. | Percent shrinkage after 3 hr. washing | | Felting |
|---|---|---|---|
| | Warp | Fill | |
| 1 | 2.6 | 0.0 | None. |
| 2 | 2.4 | 0.3 | Do. |
| 3 | 6.0 | 3.6 | Do. |
| Control | 22.5 | 4.0 | Very Bad. |

*Example 12.*—Chloroprene, 22.5 parts, and styrene, 2.5 parts, were placed in a pressure bottle cooled to −10° to −15° C. A water phase consisting of 3 parts Ivory soap flakes, 3 parts isopropanol and 5 parts of 1% aqueous potassium persulfate, dissolved in 57.5 parts distilled water was added to the monomers. The bottle was sealed, shaken thoroughly, then placed in a shaking device in a water bath at 10–15° C. for 16 hours. Heat was applied to the bath and the temperature reached 55° C. after 3 hours. Heating was continued for 6 hours. The pressure bottle was then cooled and the emulsion removed. Sufficient ammonia was added to raise the pH of the emulsion to approximately pH 8. A portion of the emulsion was diluted with water until the solids content was approximately 5%, to form a padding liquor. A sample of wool flannel was padded in the emulsion, dried, washed and measured according to the procedure of Example 9. The polymer composition and the calculated solids picked up by the wool are listed in Table X. The amount of shrinkage in percentage and the amount of felting after laundering may be found in Table XI.

*Example 13.*—An emulsion was prepared exactly like that in Example 12, except that 2.5 parts of acrylonitrile were used instead of the 2.5 parts styrene used in Example 12. Polymerization and wool treatment were identical with Example 12. The polymer composition and the solids picked up by the wool are listed in Table X. The amount of shrinkage in percentage and the amount of felting may be found in Table XI.

*Example 14.*—An emulsion was prepared as follows. Chloroprene, 20 parts, and ethyl acrylate, 5 parts, were placed in a pressure bottle cooled to −10 to −15° C. Six parts of a 50% solution of cetyl dimethyl benzyl ammonium chloride in isopropanol were dissolved in 57.5 parts distilled water, 5 parts of a 1% aqueous solution of potassium persulfate were added and the water phase was cooled to 5° C. and added slowly to the above monomers. The pressure bottle was sealed and placed in a shaking device on a water bath and shaken for 16 hours at 10°–15° C. Heat was applied for 3 hours until the temperature reached 55° C., then heating was continued for 6 hours at that temperature. The emulsion was cooled to room temperature, then diluted to 5% solids concentration. A sample of wool flannel was padded in the emulsion, dried, washed, and measured according to the procedure explained in Example 9. The polymer composition and the solids picked up by the wool are listed in Table X. The amount of shrinkage in percentage and the amount of felting after laundering may be found in Table XI. A piece of untreated flannel was relaxed by soaking in a 1% soap solution for 2 hours, rinsed, dried, and measured as a control as listed in Table XI.

*Table X*

| Sample No. | Percent composition of polymer | Example No. | Percent solids on Wool |
|---|---|---|---|
| 1 | 90% chloroprene, 10% styrene | 12 | 4.9 |
| 2 | 90% chloroprene, 10% acrylonitrile | 13 | 5.0 |
| 3 | 80% chloroprene, 20% ethyl acrylate. | 14 | 5.0 |

*Table XI*

| Sample No. | Percent shrinkage after 3 hr. washing | | Felting |
|---|---|---|---|
| | Warp | Fill | |
| 1 | 5.1 | 2.4 | None. |
| 2 | 3.9 | 1.0 | Do. |
| 3 | 6.8 | 2.2 | Slight. |
| Control | 21.7 | 2.1 | Bad. |

For the best shrinkproofing effects, the emulsions contain the copolymer in a condition in which it is unsuitable as synthetic rubber or rubber-like material. If coagulated by any suitable means, the emulsions give crumbly materials which cannot be milled or sheeted as on rubber milling equipment in the way that rubber is manipulated. The copolymer is in the form where extensive cross-linking has occurred as further pointed out below.

To enhance such materials for use for shrinkproofing, they may desirably be given an oxidation treatment, preferably while in aqueous emulsion as obtained from the polymerization step, to convert them into what may be called a pre-vulcanized condition so that upon deposition of the polymer on, in or about the fibers or textiles, the polymer is in a non-tacky condition and gives a non-tacky deposit. Or the polymer in such emulsions utilized in accordance with the present invention is in a condition in which it is substantially insoluble in organic solvents such as benzene, toluene, xylene, carbon tetrachloride, chloroform, and tetrachlorethane, but, however, may be swollen to some extent with such solvents. The vulcanization has been carried to a point where substantially no soluble polymer remains, but, as stated above, the gel-forming polymer may be swollen to some extent with the stated solvents.

Where such pre-vulcanization by oxidation is employed, the emulsions are prepared by carrying out the polymerization in the presence of polymerizing agents in which emulsions the polymer or copolymer is present in such condition that if deposited on fibers a tacky deposit would be obtained, or the polymer is substantially soluble in common organic solvents at this time, or is incompletely vulcanized, and the emulsion thus prepared is subjected to an oxidative treatment by means of hydrogen peroxide or other substances which liberate oxygen under the conditions of treatment to convert the polymer or copolymer present in such emulsions into a condition where upon deposition on fibers it gives a non-tacky deposit, or gives a deposit which is substantially insoluble in common organic solvents, or is substantially completely vulcanized and in the form of a cross-linked polymer. The first step is carried to a point of substantially complete polymerization, by which is meant little or no monomer is present. The emulsion at this point may be subjected to vacuum or other treatment to remove any volatile hydrocarbons which may be present, before the step of oxidative vulcanization. The term oxidative pre-vulcanization may be used to describe the final condition of the polymer in the emulsion without any implication that an oxygen link is necessarily involved.

Such oxidative pre-vulcanization may be carried out at temperatures for example of 70–100° C., with oxygen yielding substances such as hydrogen peroxide, benzoyl peroxide, ammonium persulfate, acetyl peroxide, butyl hydroperoxide, butyl perbenzoate, etc., for a period of from 45 minutes to 1½ hours. Such oxidative treatment of the emulsion is desirably carried out in the absence of the antioxidants, the latter being added after the oxidation treatment has been carried to the point desired. This addition of antioxidant is desirable so that further oxidative change will not continue after the material has been applied to the textile.

Surprisingly, it has been found that an antioxidant has a very direct and important effect in enhancing shrinkproofing and other desirable qualities in the treated wool. These antioxidants may vary in character but generally are the phenols and amines particularly of aromatic character such as monobenzyl ether of hydroquinone, phenyl β-naphthylamine, p-hydroxyphenyl glycine, etc. The amount present should be sufficient to secure the results desired, small amounts as from 1% to 5% on the weight of the polymer usually being sufficient not only to improve shrinkproofing extensively but to give the treated product increased heat resistance, etc. For instance with a 3% application of a soap emulsion of butadiene polymer containing 1½% of monobenzyl ether of hydroquinone, a 5% shrinkage in the warp was found after 10 washings at 105° F. for 10 minutes. In a similar fabric containing the same amount of butadiene polymer but containing no monobenzyl ether of hydroquinone, a 17% shrinkage in the warp was found. The effect of the antioxidant on shrinkproofing results obtained is therefore, important and noteworthy.

Having thus set forth my invention, I claim:

1. A bath for treating wool to give shrinkproofing with substantially normal hand which comprises an aqueous substantially stable emulsion containing a copolymer of 100% polymerization of chloroprene and an amount of from 5% to 60% by weight of the copolymer of a compound selected from the group consisting of an alkyl acrylate, the alkyl group containing not more than 4 carbon atoms, styrene, dimethyl styrene, dichloro styrene, acrylonitrile, and methacrylonitrile, the copolymer being present in the emulsion in an amount to give from 1 to 25% by weight of copolymer deposition on the wool, the emulsion containing a non-cationic emulsifying agent and at least 25% by weight on the copolymer of a water-soluble neutral salt of an alkali metal as a conditioning electrolyte, the pH of the bath being below 7.

2. A bath as set forth in claim 1, in which the copolymer is of chloroprene and ethyl acrylate, the latter not exceeding 50% by weight of the copolymer.

3. A bath as set forth in claim 1, in which the copolymer is of chloroprene and styrene, the latter not exceeding 60% by weight of the copolymer.

4. A bath as set forth in claim 1, in which the copolymer is of chloroprene and acrylonitrile, the latter not exceeding 40% by weight of the copolymer.

5. A bath as set forth in claim 1, in which the emulsifying agent is anionic.

6. A bath as set forth in claim 1, containing 1 to 5% by weight on the copolymer of an antioxidant for the copolymer.

JOHN B. RUST.

REFERENCES CITED

The following references are of record in the file of this patent:

UNITED STATES PATENTS

| Number | Name | Date |
| --- | --- | --- |
| 2,340,358 | Young | Feb. 1, 1944 |